US009755438B2

(12) United States Patent
Thompson

(10) Patent No.: US 9,755,438 B2
(45) Date of Patent: Sep. 5, 2017

(54) CHARGING STATION FOR ELECTRIC CANDLES AND OTHER DEVICES

(71) Applicant: Luminara Worldwide, LLC, Eden Prairie, MN (US)

(72) Inventor: Jeff Thompson, Huntington Beach, CA (US)

(73) Assignee: Luminara Worldwide LLC, Eden Prairie, MN (US)

( * ) Notice: Subject to any disclaimer, the term of this patent is extended or adjusted under 35 U.S.C. 154(b) by 342 days.

(21) Appl. No.: 13/963,730

(22) Filed: Aug. 9, 2013

(65) Prior Publication Data

US 2014/0042962 A1 Feb. 13, 2014

Related U.S. Application Data

(60) Provisional application No. 61/681,247, filed on Aug. 9, 2012, provisional application No. 61/698,367, filed on Sep. 7, 2012.

(51) Int. Cl.
| | |
|---|---|
| *H02J 7/00* | (2006.01) |
| *H02J 7/02* | (2016.01) |
| *H02J 50/10* | (2016.01) |
| *H02J 50/80* | (2016.01) |

(52) U.S. Cl.
CPC .......... *H02J 7/0013* (2013.01); *H02J 7/0027* (2013.01); *H02J 7/0044* (2013.01); *H02J 7/025* (2013.01); *H02J 50/10* (2016.02); *H02J 50/80* (2016.02)

(58) Field of Classification Search
USPC ....................................................... 320/107
See application file for complete search history.

(56) References Cited

U.S. PATENT DOCUMENTS

| | | | |
|---|---|---|---|
| 4,764,853 | A | 8/1988 | Thomas et al. |
| 6,479,965 | B2 | 11/2002 | Barbeau et al. |
| D486,787 | S | 2/2004 | Kriger et al. |
| 6,719,443 | B2 | 4/2004 | Gutstein et al. |
| 6,819,080 | B2 | 11/2004 | Barbeau et al. |
| 6,981,786 | B2 | 1/2006 | Yao et al. |
| D567,993 | S | 4/2008 | Shiu |
| 7,391,182 | B2 | 6/2008 | Barbeau et al. |
| 7,400,112 | B2 | 7/2008 | Barbeau et al. |
| 7,503,668 | B2 | 3/2009 | Porchia et al. |

(Continued)

FOREIGN PATENT DOCUMENTS

| | | |
|---|---|---|
| AT | 11272 U1 | 7/2010 |
| CA | 2414699 | 10/2004 |

(Continued)

OTHER PUBLICATIONS

Patent Cooperation Treaty, "Notification of Transmittal of the International Search Report and the Written Opinion of the International Searching Authority, or the Declaration", PCT Application No. PCT/US2013/054403, issued Dec. 17, 2013.

*Primary Examiner* — Mohammed Alam
(74) *Attorney, Agent, or Firm* — Umberg Zipser LLP

(57) ABSTRACT

Various embodiments of charging stations are described that are configured to charge a plurality of electric lights or other devices. The charging stations can be multi-level to allow for charging of many candles while limiting the space required by the stations. The charging stations can be modular to allow them to be dynamically adapted to the varying needs of a user.

6 Claims, 11 Drawing Sheets

(56) References Cited

U.S. PATENT DOCUMENTS

| | | | |
|---|---|---|---|
| RE41,628 E | 9/2010 | Barbeau et al. | |
| 8,210,708 B2 | 7/2012 | Hau et al. | |
| 8,454,190 B2 | 6/2013 | Hau et al. | |
| 8,579,461 B2 | 11/2013 | Fournier et al. | |
| 2001/0055207 A1* | 12/2001 | Barbeau | F21L 2/00 362/194 |
| 2004/0037069 A1 | 2/2004 | Blackbourn | |
| 2005/0254248 A1 | 11/2005 | Lederer | |
| 2007/0223217 A1* | 9/2007 | Hsu | F21S 6/001 362/183 |
| 2008/0038156 A1 | 2/2008 | Jaramillo | |
| 2009/0273309 A1* | 11/2009 | Kuo | H02J 7/355 320/101 |
| 2010/0124050 A1* | 5/2010 | Hau | F21S 6/001 362/183 |
| 2010/0176762 A1* | 7/2010 | Daymude et al. | 320/115 |
| 2011/0317403 A1* | 12/2011 | Fournier | F21S 6/001 362/183 |
| 2012/0201020 A1 | 8/2012 | Gutstein et al. | |
| 2012/0287612 A1 | 11/2012 | Hau et al. | |
| 2013/0265748 A1 | 10/2013 | Hau et al. | |

FOREIGN PATENT DOCUMENTS

| | | |
|---|---|---|
| CA | 2661165 | 2/2009 |
| CA | 2505668 | 1/2011 |
| CN | 2913825 | 6/2007 |
| CN | 2932035 | 8/2007 |
| CN | 201032068 | 3/2008 |
| CN | 201053585 | 4/2008 |
| CN | 201606675 | 10/2010 |
| CN | 201947502 U | 8/2011 |
| CN | 202024234 | 11/2011 |
| CN | 202101192 | 1/2012 |
| CN | 202195403 | 4/2012 |
| CN | 202195404 | 4/2012 |
| CN | 101865413 | 8/2012 |
| CN | 102628550 A | 8/2012 |
| CN | 102721002 | 10/2012 |
| CN | 102734740 | 10/2012 |
| CN | 202947060 U | 5/2013 |
| DE | 20302795 U1 | 5/2004 |
| DE | 202004004908 | 7/2004 |
| EP | 2261552 A1 | 12/2010 |
| EP | 1297724 | 8/2011 |
| GB | 2377327 | 1/2003 |
| JP | 2005-078809 A | 3/2005 |
| JP | 2007295677 A | 11/2007 |
| KP | 10-2011-0061893 A | 6/2011 |
| WO | 2005/048393 | 5/2005 |
| WO | 2011/139884 | 11/2011 |

\* cited by examiner

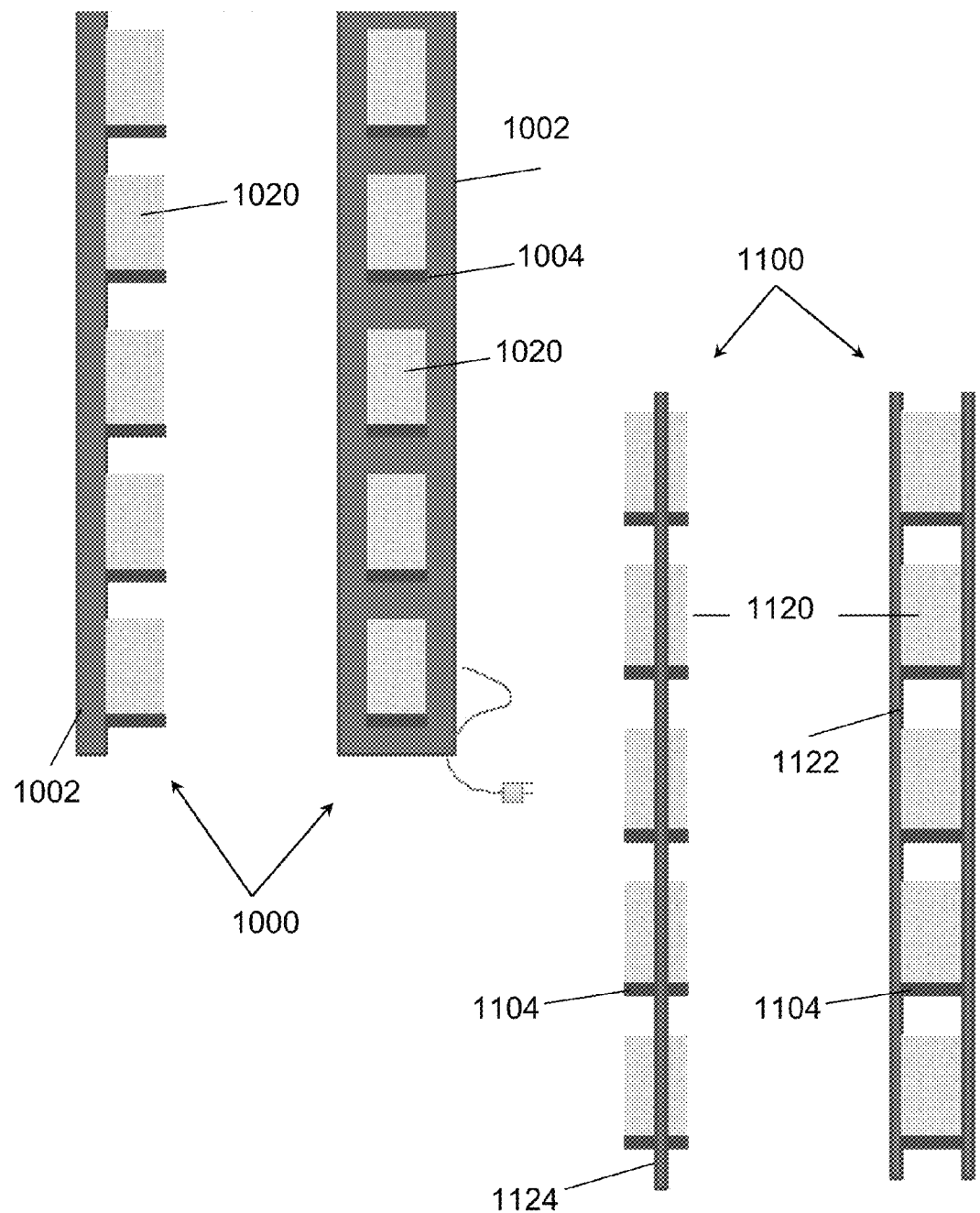

CHARGING STATION FOR ELECTRIC CANDLES AND OTHER DEVICES

This application claims the benefit of priority to U.S. provisional application having Ser. No. 61/681,247 filed on Aug. 9, 2012 and U.S. provisional application having Ser. No. 61/698,367 filed on Sep. 7, 2012. These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is charging stations for electric lights and other devices.

BACKGROUND

The following background discussion includes information that may be useful in understanding the present invention. It is not an admission that any of the information provided herein is prior art or relevant to the presently claimed invention, or that any publication specifically or implicitly referenced is prior art.

Numerous charging systems are known in the art, all of which suffer from one or more disadvantages. See, e.g., Canadian pat. publ. nos. 2414699, 2505668, and 2661165; China pat. publ. nos. 202024234, 202195404, 201053585, and 201081091, UK pat. publ. no. 2377327, U.S. Pat. Nos. 7,391,182, 7,503,668, D0,567,993, D0,486,787, 8,210,708, 6,981,786, 6,719,443 and 6,819,080, and U.S. pat. publ. no. 2001/0055207, 2011/0317403, 2012/0201020, 2008/0038156, 2004/0037069, and 2007/0223217.

For example, U.S. pat. publ. no. 2010/0124050 to Hau et al. discusses an inductive charging station that allows for additional candles to be charged. However, Hau's device is non-stackable, which significantly increases the surface area required when a large number of candles require charging. U.S. pat. publ. no. 2011/0317403 to Fournier, et al. contemplates a stackable charging station to reduce the horizontal space required, but the candles can be difficult to remove from the stackable device, especially those on the lowest levels, without first removing the upper levels of the device.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

Thus, there is still a need for improved charging stations for electric lights.

SUMMARY OF THE INVENTION

The inventive subject matter provides apparatus, systems and methods for recharging a set of electric lights or other devices. In some contemplated embodiments, a recharging station can include at least first and second levels, at least one of which has a slideable tray that facilitates access to the electric lights being charged without requiring removal of an upper level or top.

Other contemplated charging stations could include a ferrous material that can be electrified to thereby allow for charging of electric lights and other devices that are inserted into the ferrous material.

In still further contemplated embodiments, a charging station could include a metal strip onto which an electric light or other device can be placed to thereby provide current to the electric light or device.

Yet another contemplated charging station can include a plurality of fingers, at least some of which have an electrical contact that is configured to come into contact with an electrical contact of an electric light or other device to be charged.

Contemplated candles or other electric lights can include a rechargeable battery, and could include advanced batteries that are able to quickly recharge.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIGS. 10A-11B are front views of a vertically-arranged charging station.

DETAILED DESCRIPTION

It should be noted that while portions of the following description is drawn to a computer/server based lighting and/or charging systems, various alternative configurations are also deemed suitable and may employ various computing devices including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1A:
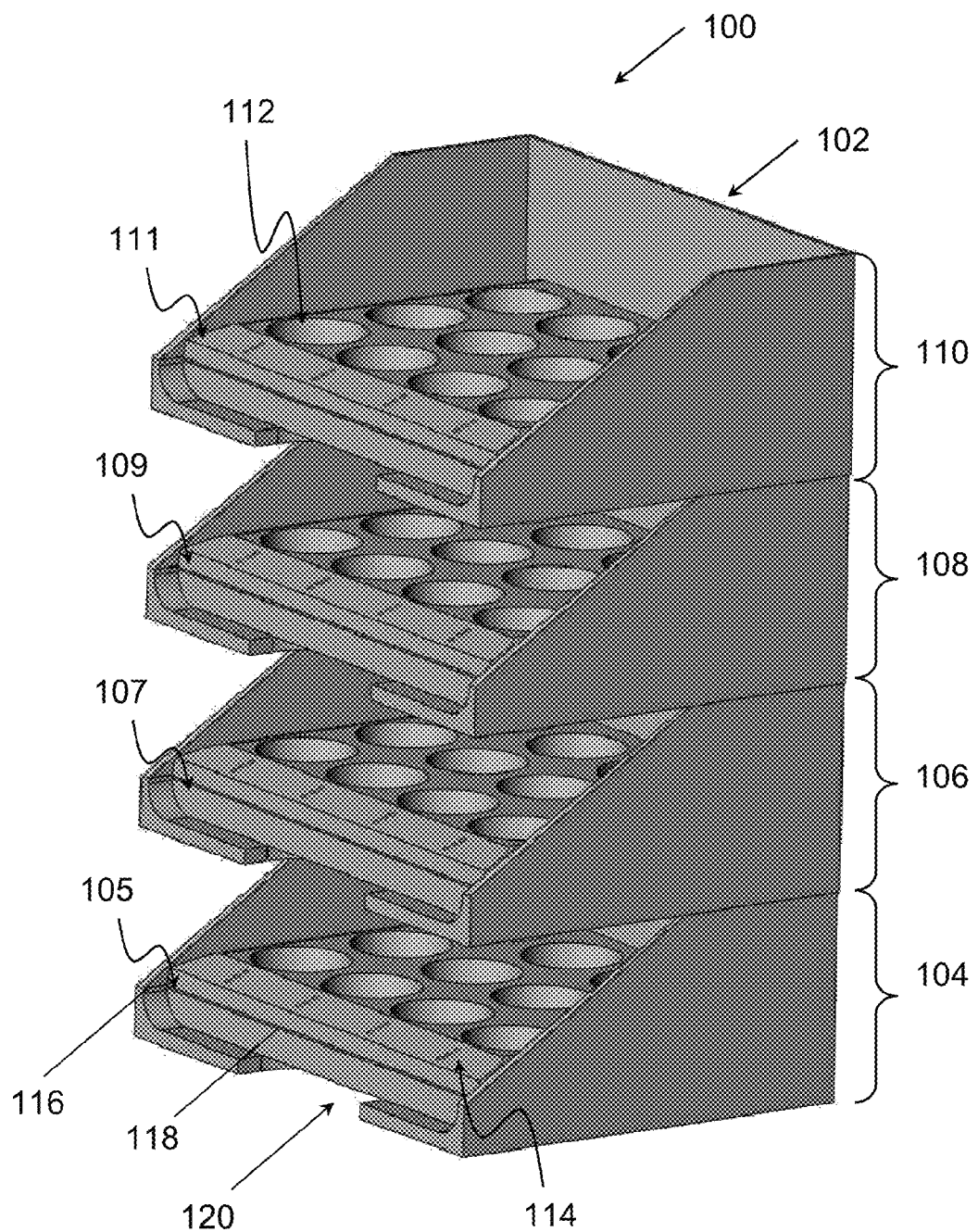
FIGS. 1A-1C are perspective, side, and front views, respectively, of one embodiment of a multi-level charging station.
Figure 1B:
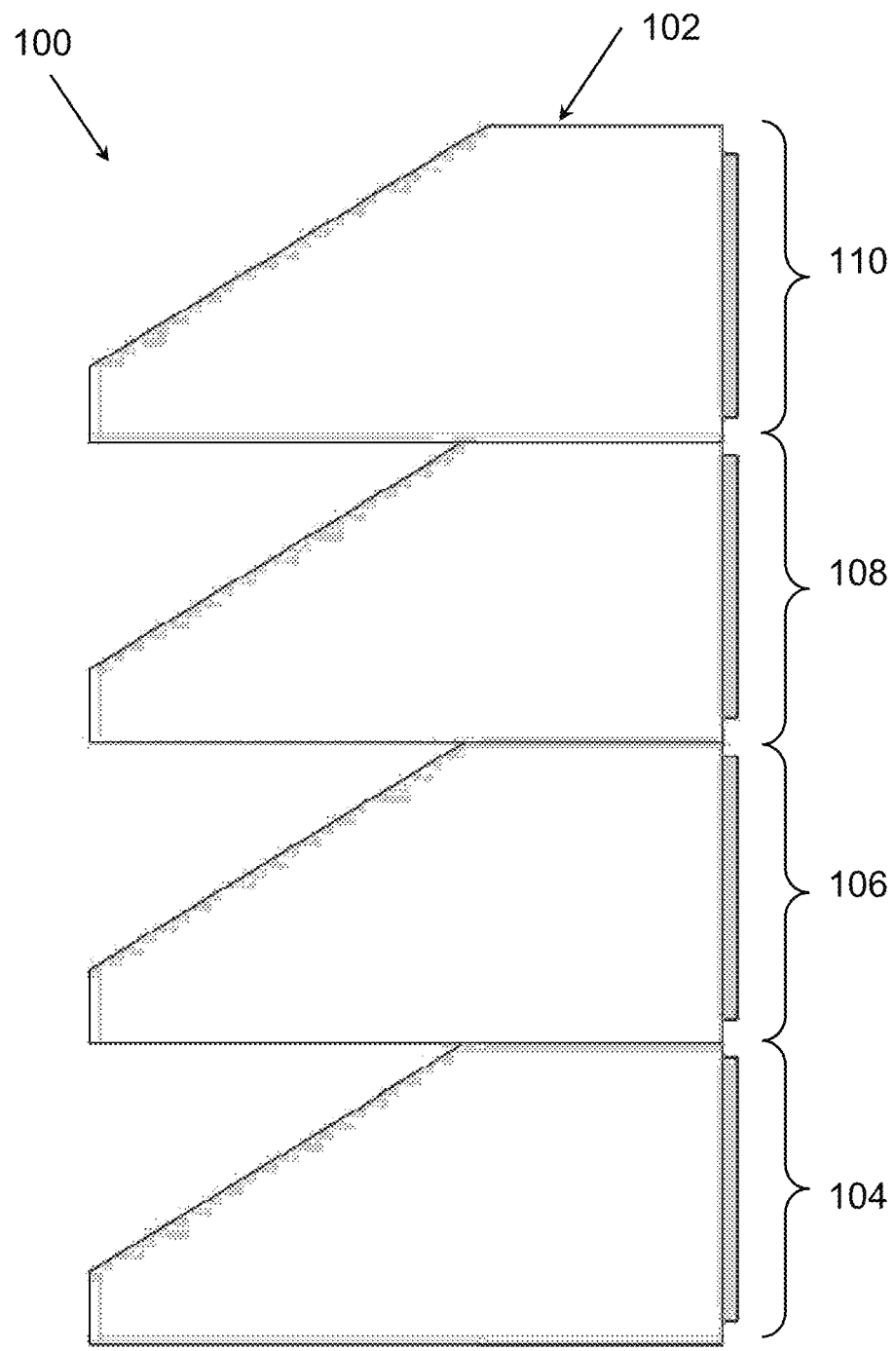
Figure 1C:
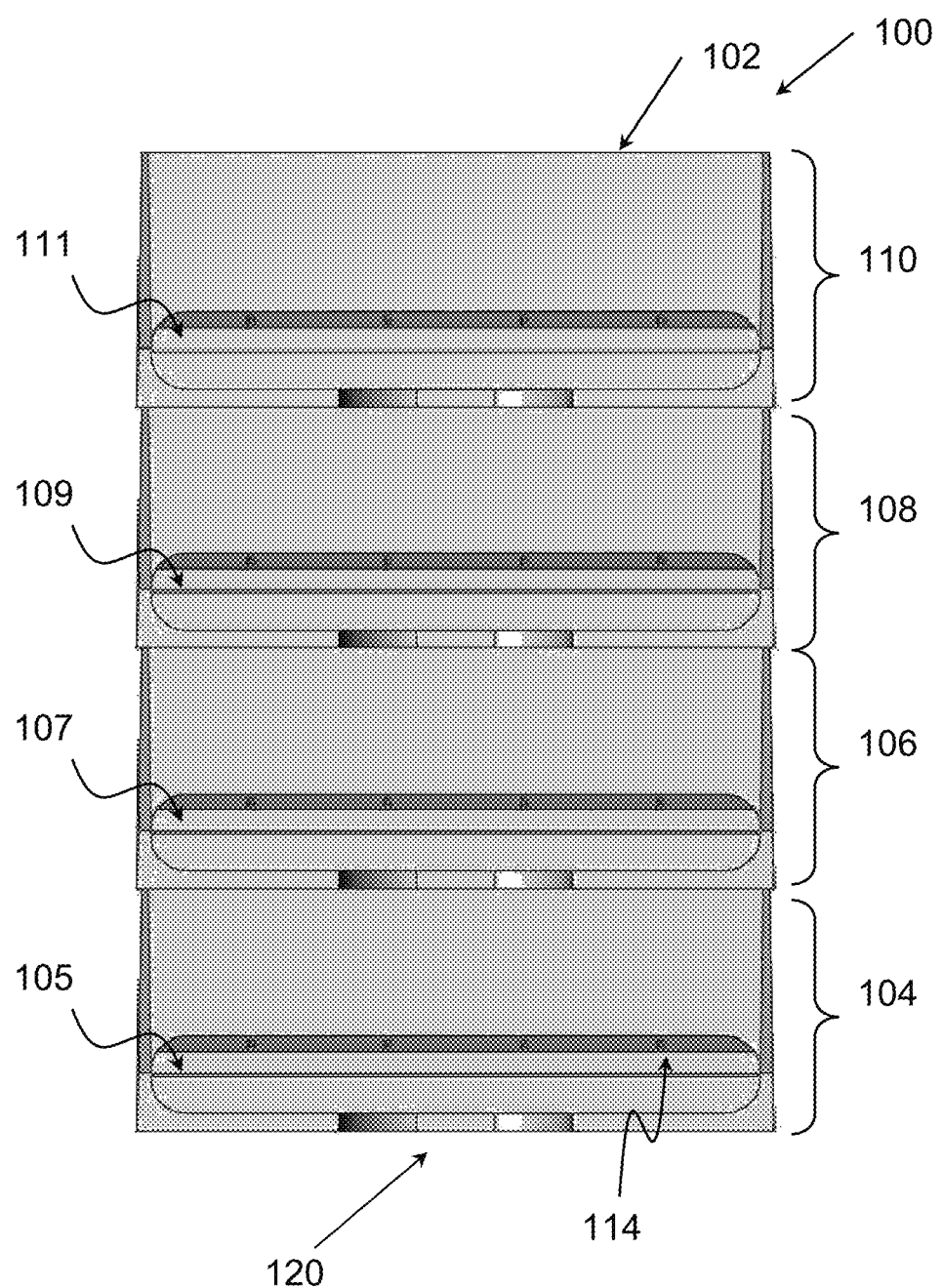

In FIGS. 1A-1C, one embodiment of a multi-level charging station 100 is shown having a base 102 that includes first, second, third, and fourth sections 104, 106, 108, 110. Although four sections are shown, contemplated stations can include one or more sections, and preferably at least two sections, depending on the needs of the user and the number of electric lights or devices to be charged simultaneously.

Each of the sections 104, 106, 108, 110 preferably includes a tray 105, 107, 109, 111, respectively, at least one of which can be removably coupled to the base 102. Each tray 105, 107, 109, 111 can include one or more charging ports 112, each of which is sized and dimensioned to receive an electrical light or other device. Preferred devices include flameless (electric) candles, such as those described in U.S. Pat. No. 8,070,319. Although each charging port of a tray will typically be the same size and dimension as neighboring charging ports, it is contemplated that a tray could include at least two sets of charging ports, where the first set of charging ports are smaller or larger in size than the second set. In such embodiments, differently size electric candles or other light sources could advantageously be charged in the same tray.

In this manner, each of the trays 105, 107, 109, 111 can be configured to receive and charge a set of electric lights or other devices. Thus, for example, the first tray 105 can be configured to receive a first set of electric lights, the second tray 107 can be configured to receive a second set of electric lights, and so forth.

The ports 112 can optionally include a recessed portion that is configured to receive a bottom portion of the candle or other device to help prevent the candle or device from being unintentionally removed from the port 112. It is further contemplated that the port 112 could include one or more protrusions that are sized and dimensioned to mate with one or more recessed portions of the bottom of the candle or device to help maintain an upright position of the candle or device while coupled to the base 102. Alternatively, the bottom of the candle or device could include the projections, such as feet to raise a bottom of the candle or device from a surface, and the port 112 could include one or more recessed areas configured to receive the projections.

The trays 105, 107, 109, 111 are each electrically coupled to the base 102, preferably via a wired connection, although wireless connections are also contemplated. The trays 105, 107, 109, 111 could be serially coupled to the base 102, such that the third tray 109 is electrically coupled to the second tray 107, which is electrically coupled to the first tray 105. Alternatively, one or more of the trays 105, 107, 109, 111 could be electrically coupled in parallel to the base 102.

In especially preferred embodiments, the trays 105, 107, 109, 111 are each slideably coupled to the base 102, such that the trays 105, 107, 109, 111 can be quickly and easily be removed when needed to place candles on the trays 105, 107, 109, 111 or remove candles from the trays 105, 107, 109, 111. This is especially useful for those devices charging on lower trays and sections, as it would otherwise be difficult to access the devices without first removing the upper sections. In addition, by allowing for a removable tray at one or more of the sections, a different tray could be inserted in the place of a tray just removed. For example, a tray of charged electric candles could be removed, and a different tray of electric candles could be electrically coupled to the base 102 in place of the tray.

In other contemplated embodiments, it is contemplated that one or more of trays 105, 107, 109, 111 could be attached to the base 102 or even integral with the base 102.

As shown in FIG. 1A, the trays 105, 107, 109, 111 could be stacked one on top of the next in a sequential manner. Thus, the second tray 107 can be disposed above the first tray 105 and so forth.

It is contemplated that the various sections 104, 106, 108, 110 can be stacked as shown, and removably coupled, such that one or more sections could be removed from the station 100 if desired. This advantageously allows for dynamic adjustment of the height and the number of charging ports provided in the charging station 100 by simply adding additional sections or removing sections when no longer needed. For example, a consumer may have a two level charging station and later need to increase the charging station's capacity. By allowing for additional sections to be coupled to and stacked on the existing sections, this allows the charging station's capacity to increase as needed over time without requiring replacement of the charging station 100 and without increasing the surface area required for the charging station 100.

In such embodiments, the sections 104, 106, 108, 110 could be electrically coupled via a wire, although it is preferred that an upper section is electrically coupled to the section below as it is stacked on the lower section. In an exemplary embodiment, the sections 104, 106, 108, 110 could each include one or more electrical contacts on their bottom and top surfaces, and preferably, the one or more electrical contacts on the top surface are configured to couple with one or more electrical contacts on a bottom surface of an adjacent section.

In other contemplated embodiments, the sections forming the base 102 could be fixedly attached to or integral with one another.

The charging station 100, and preferably the trays, can have one or more indicators 114, which can indicate whether the charging station 100 is receiving power, whether the candles or other devices are charged or being charged, and so forth. Thus, for example, the one or more indicators 114 may blink green while a candle is charging, remain green when a candle is fully charged, and optionally could be red or another color if an error occurs. It is especially preferred that the charging station 100 can include an indicator light 114 for each of the charging ports 112, so that a user can quickly learn which candles or other devices are fully charged. Such indicators could be divided by section, and, for example, be disposed on each tray as shown in FIG. 1A, or be disposed on a side of the base 102, or any other suitable location.

In addition to or alternatively, the charging station 100 can optionally include a display screen that indicates the progress of charging of an individual candle or device or a tray of candles or devices. The display screen could further indicate the amount of time left to charge a single candle or device, a tray of candles or devices, or every candle or device currently being charged. It is further contemplated that the display screen could be a touch screen display such that the user could input commands to the station 100. For example, the screen could be used to program one or more of the candles or other electric devices. Such commands could then be sent to the individual candle or device via the electrical coupling, a separate physical connector, or a wireless connection. For example, when charging electric candles or lights, such program could include a specific lighting schedule or routine, such that the candles or lights could be synchronized when lit, could automatically illuminate and turn off at specific times of the day, could have a certain waveform pattern, could have a specific program of brightness and colors to use when illuminated, and so forth.

In embodiments where the trays are removable from or slideable with respect to the charging station 100, it is contemplated that the base or sections can include one or more tracks 116 that are preferably configured to mate with a protrusion of the tray to be inserted, such that the track 116 can guide and properly align the tray within the charging station. Thus, for example, each of the sections could include a track 116 that cooperates with a tray to thereby facilitate insertion of the tray within the base 102. The track 116 could comprise an indented portion into which a protrusion 118 or other component of the tray could be inserted. Alternatively, the track could comprise a protrusion or other component that is inserted within an indentation of the tray.

Each of the sections 104, 106, 108, 110 can further include an indentation 120, which allows for easier removal of the tray from the specific section.

In preferred embodiments, it is contemplated that the electric lights or other devices to be charged can be magnetically coupled to the tray such that the devices maintain a specific position and/or orientation with respect to the tray. This can be accomplished by providing a magnet in each device or the tray. Alternatively, it is contemplated that the electric lights or other devices could be physically held in place by the electrical connection, a protruding element, or sidewalls of the charging port, for example.

At least one of the first and second trays could have a set of inductive coils such that the at least one of the first and second trays is configured to allow for inductive charging of the candles.

Figure 2:
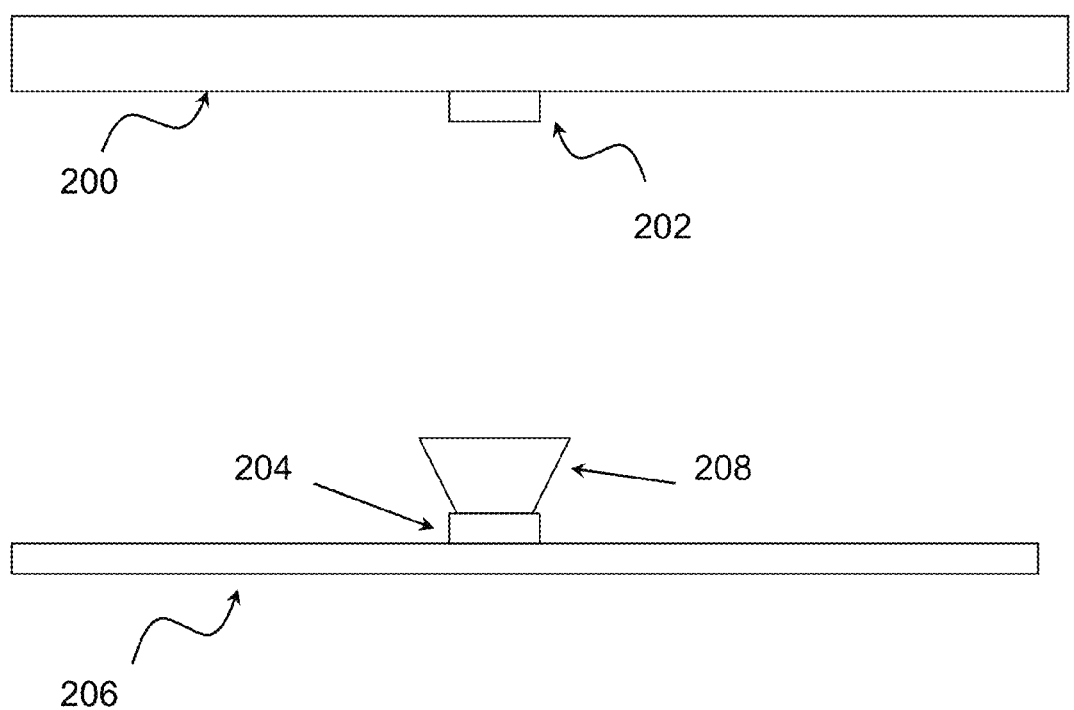
FIG. 2 is a top view of an exemplary embodiment of male and female electrical couplings.

In embodiments where the trays are removable from the charging station, it is contemplated that the tray 200 could include an electrical connector 202 that is configured to couple with an electrical connector 204 of the base 206. For example, as shown in FIG. 2, a tray 200 could include a male connector 202 that is sized and dimensioned to mate with a female connector 204 of the section or base 206. In such embodiments, it is especially preferred that the female connector 204 include a tapered housing 208 surrounding the connector 204 such that the male connector 202 can be aligned with the female connector 204 as the tray 200 is inserted into the section or base 206. Of course, the tray 200 could alternatively include the female connector while the section of base includes the male connector. In addition, it is contemplated that the tapered portion could be disposed as a recess within the base or tray, depending on where the female connector is located.

Figure 3:
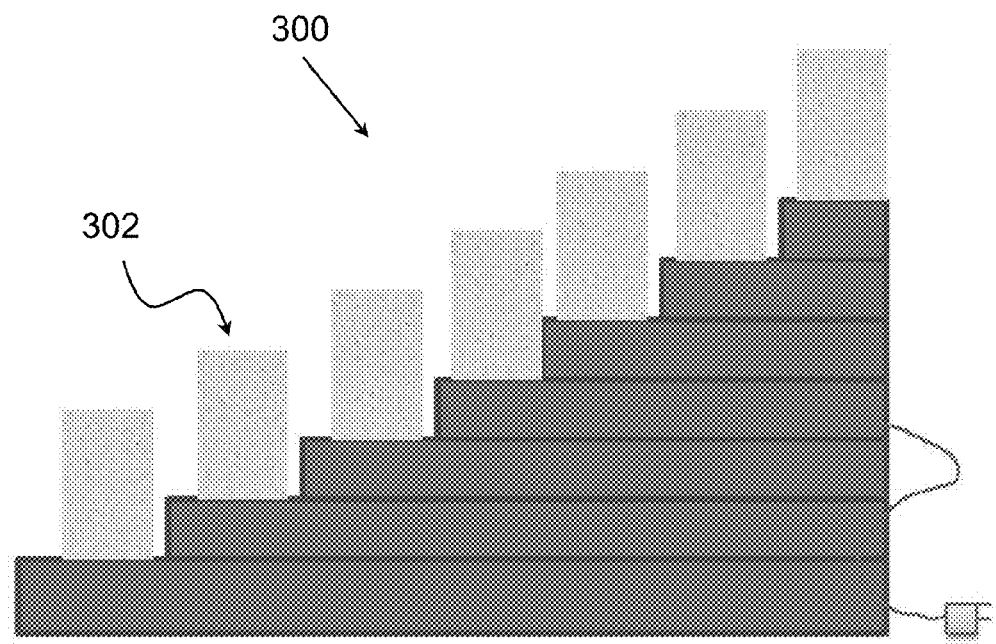
FIG. 3 is a side view of another embodiment of a multi-level charging station.

FIG. 3 illustrates another embodiment of a multi-level charging station 300 in which the individual levels are tiered to provide easy access to the individual candles 302 or lights being charged. In addition, such an arrangement can be visibly appealing to viewers of the lights or devices being charged and can be used to conceal the charging station 300. For example, such an arrangement could be used for lighting of candles in church or other religious functions. The different levels are preferably attached, but in other embodiments, could be removably coupled to one another.

Although the station 300 could include trays at each level where an upper tray has a surface area that is less than a surface area of a lower tray, it is preferred that the station is an integral piece with charging ports or areas disposed at different heights of the station. As shown in FIG. 3, the station could have a stair-like appearance with charging ports or areas at each step.

The charging ports could be similar to those shown in FIG. 1A, or could utilize induction to charge the candles or other devices. Alternatively, each of the steps could include a metal strip that can charge the candles or devices when they are placed in contact with the metal strip.

Figure 4:
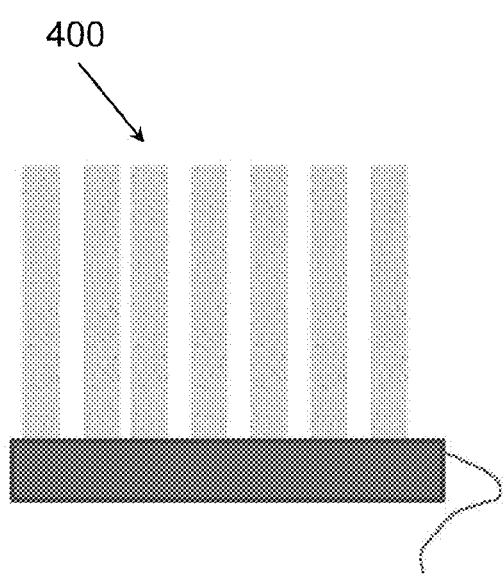
FIGS. 4-5 are front, perspective views of various embodiment of charging stations.
Figure 5:

FIGS. 4-5 illustrate different embodiments of charging stations 400 and 500, respectively. In FIG. 4, a charging station for tapered candles is shown. FIG. 5 illustrates a charging station 500 configured to resemble a menorah. It is contemplated, for example, that the candles or electric lights could be automatically timed to illuminate every 24 hours for a given time period. Although such schedule could be preprogrammed into the candles, it is also contemplated that the candles or lighting devices could be programmed with such instructions automatically when they are electrically coupled to the charging station, such as via the electrical coupling, a separate wired connection, or a wireless connection. Thus, the candles or lighting devices could be "smart" devices in that they can change or receive programming as a function of the charging station or location where they are placed.

Figures 6A, 6B:
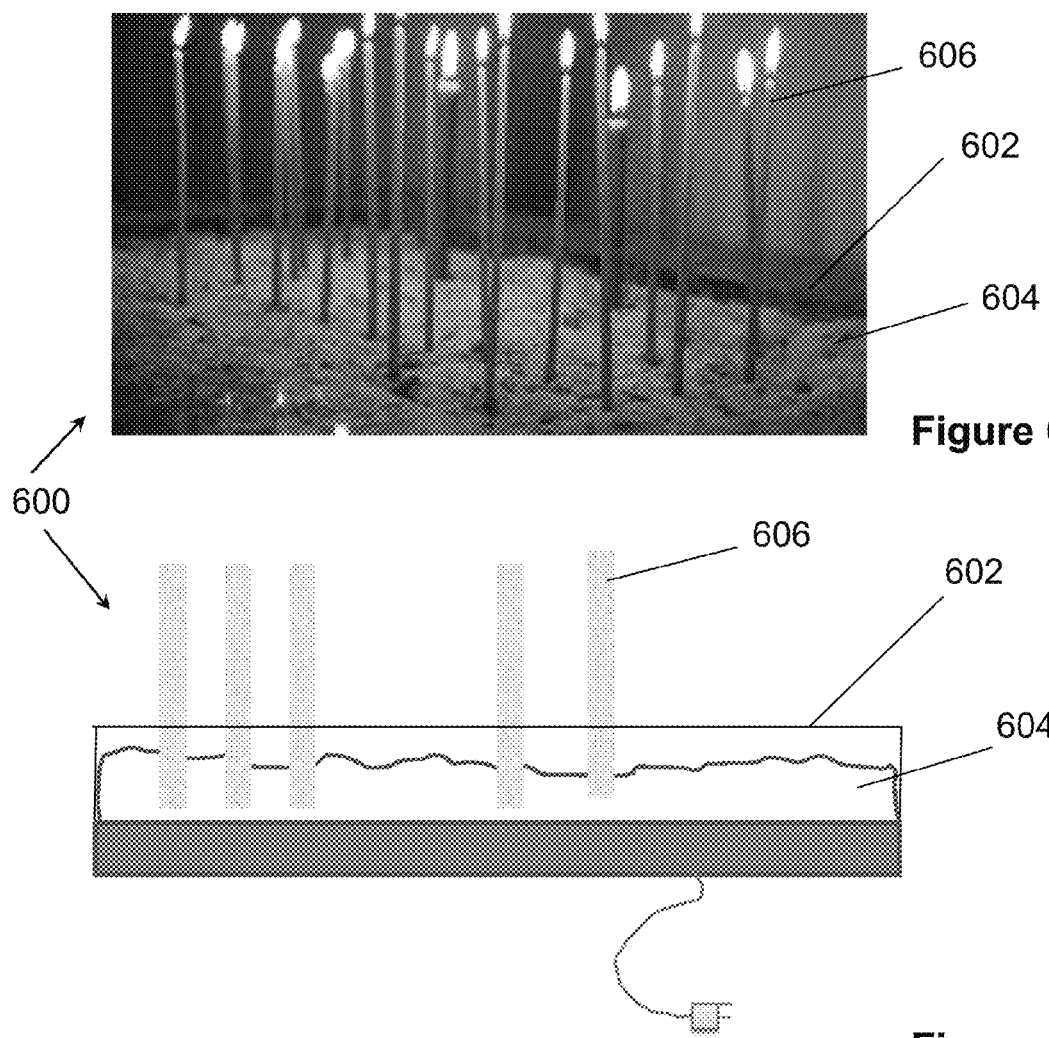
FIGS. 6A-6B are perspective views of another embodiment of a charging station.

In FIGS. 6A-6B, another embodiment of a charging station 600 is shown, which includes a tray 602 configured to receive a ferrous material 604. Preferably the ferrous material 604 is loosely packed into the tray 602, such that a candle or other device can be inserted into the ferrous material 604. Preferably, the tray 602 is configured to transfer current to the ferrous material 604 such that the ferrous material 604 is electrically charged by the tray 602. In this manner, it is contemplated that candles 606 or other electrical devices could be charged by inserting the candles 606 or devices into the ferrous material 604.

For example, FIGS. 6A-6B illustrate a plurality of electric candles 606 being inserted into the ferrous material 604, which can thereby charge the electric candles 606. In such embodiments, the ferrous material 604 acts as an electrical coupling to thereby allow the candles 606 to be charged or powered by simply inserting them into the ferrous material. It is contemplated that the ferrous material 604 could be dirt-like in that the material will move about the candle or device as the candle or device is inserted into the material 604, similar to inserting an umbrella pole into the sand at the beach. It is contemplated that a second substance could be mixed in with the ferrous material as needed to help maintain a position of the candles 606 with respect to the tray 602.

Methods of charging a plurality of candles or other devices are also contemplated. In some contemplated embodiment, a container can be provided that is configured to hold a ferrous material, which can then be electrically charged. An electric light can be inserted into the ferrous material to thereby allow for charging of the electric light. Alternatively, instructions can be provided to a user to insert an electric light into the ferrous material to thereby charge the electric light. In preferred embodiments, the container is configured to electrically charge the ferrous material.

Figure 7:
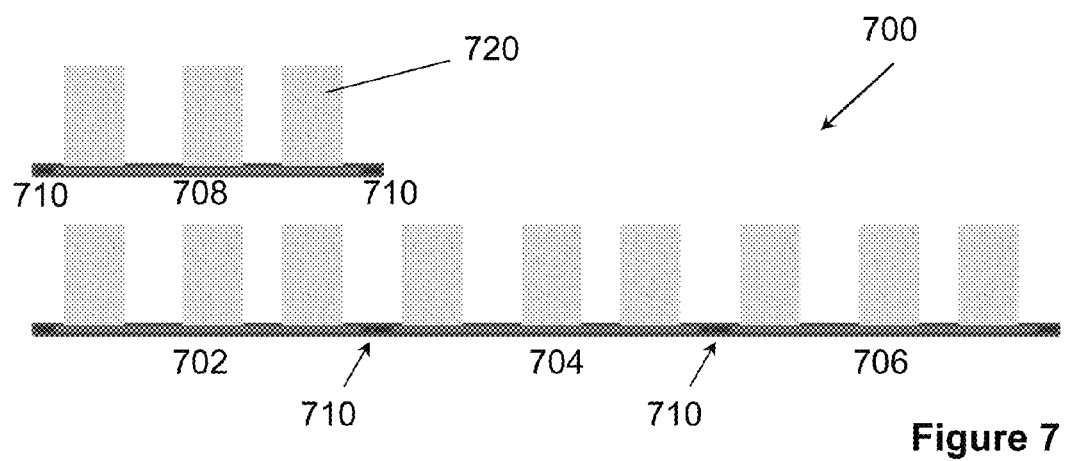
FIGS. 7-9 are front views of various other embodiments of a charging station.

FIG. 7 illustrates another embodiment of a charging station 700 that is modular in construction. For example, the charging station could include three sections 702, 704, 706, which can be coupled together via connectors 710. Any commercially suitable electrical connectors could be used to electrically couple adjacent sections. Each of the sections 702, 704, 706 can be configured to allow for charging of one or more electric candles 720 or other devices.

In some contemplated embodiments, the sections 702, 704, 706 could have predefined charging ports such as that shown in FIG. 1A, where candles or other devices are inserted into the ports and thereby charged. In other embodiments, it is contemplated that one or more of the sections 702, 704, 706 could have one or more inductive coils, which are configured to interact with an inductive coil in the candles or other devices to thereby charge such devices via induction. In still other embodiments, one or more of the sections 702, 704, 706 could alternatively include a metal strips onto which the candles or other devices to be charged can be placed. The metal strip could thereby contact an electrical contact on a bottom surface of the candle or device, for example, to thereby charge the candle or device.

The charging station 700 can optionally include a fourth section 708, which could be coupled to a section having a free connector 710. As shown in FIG. 7, the fourth section 708 could be coupled to the first section 702 or the third section 706.

Figure 8:
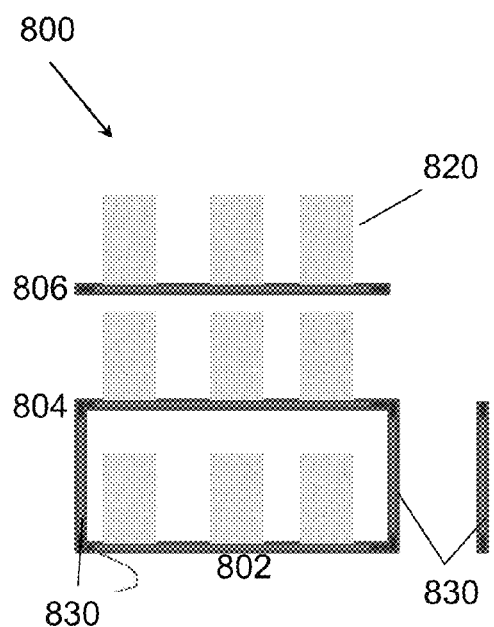

FIG. 8 illustrates another embodiment of a modular charging station 800, which can be arranged such that the sections 802, 804 and 806 are stacked vertically, one on top of the next. In some embodiments, the various sections 802, 804 and 806 could be electrically coupled via connecting pieces 830. Although it is contemplated that the connecting pieces 830 could also provide support for the upper sections of the charging station 800, support could also or alternatively be provided by separate supports. In addition to being vertically stackable, the sections could be coupled horizontally as shown in FIG. 7.

Figure 9:
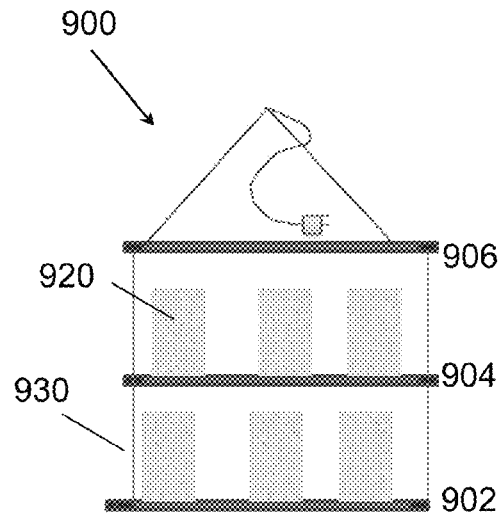

FIG. 9 illustrates yet another embodiment of a modular charging station 900, which could be hung from the ceiling or other location and could be configured to resemble a chandelier or other light source, for example. In such embodiments, it is preferred that the sections 902, 904, 906 are coupled via a flexible or wire connector 930 to provide for a more aesthetically pleasing look. With respect to the remaining numerals in FIG. 9, the same considerations for like components with like numerals of FIG. 8 apply.

FIGS. 10A-10B illustrate another embodiment of a charging station 1000 that has a base 1002 that is preferably mounted to or hung from a wall or other vertically-oriented surface. The station 1000 can include a plurality of charging trays 1004 that preferably are oriented parallel to a surface normal of the base 1002. Each of the trays 1004 could be configured to allow for charging of one or more candles or other electric lights simultaneously.

It is contemplated that the base 1002 could include predefined locations where the trays 1004 could be inserted, or the base 1002 and trays 1004 could form an integral piece. Alternatively, the base 1002 could be configured as a modular structure to allow for repositioning of the trays 1004 with respect to the base 1002, such that the vertical and/or horizontal distance between adjacent trays could be varied as needed or desired. Thus, for example, the base 1002 could be configured/constructed such that trays could be coupled in numerous locations of the base 1002. This could also allow for different sizes of trays to be coupled to the base 1002.

The base 1002 could be further configured to allow for different trays to be electrically coupled to the base 1002 preferably at various locations such that differently sized candles or other devices or different numbers of candles or other devices could be charged, for example.

FIGS. 11A-11B illustrate another embodiment of a charging station 1100 having a series of vertically mounted trays 1104. Each of the trays 1104 is preferably configured to charge one or more electric candles 1120 or other devices, such as through induction or a physically electrical coupling. The trays 1104 can be electrically coupled using thin metal strips 1122 and 1124, one of which provides a positive charge to the trays 1104 and one providing a negative charge. With respect to the remaining numerals in each of FIGS. 11A-11B, the same considerations for like components with like numerals of FIG. 10A apply.

Figure 12A:
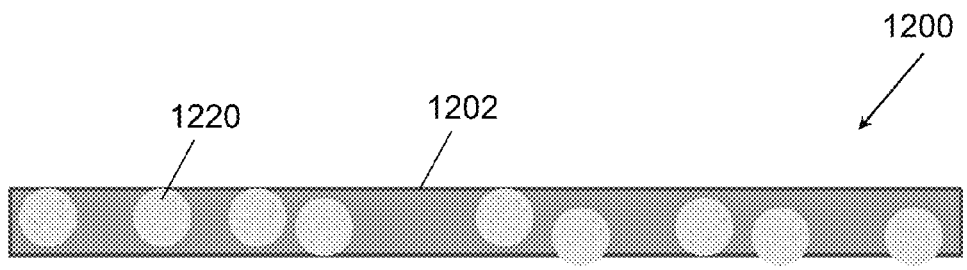
FIGS. 12A-12B are top and front views, respectively, of another embodiment of a charging station.
Figure 12B:
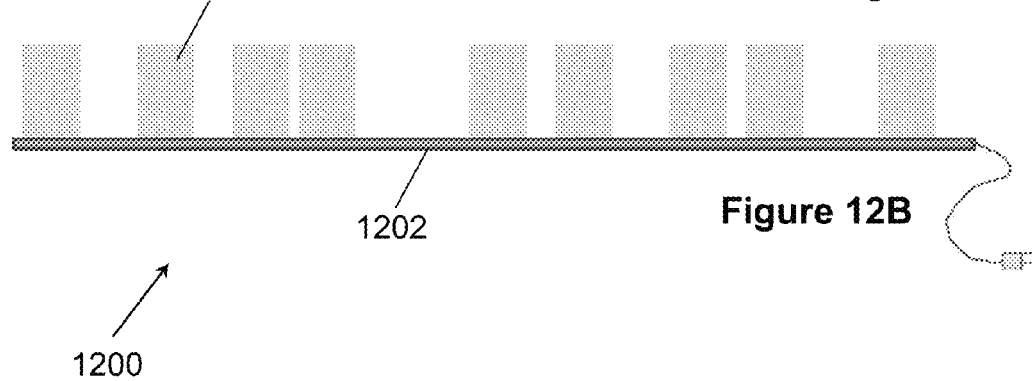

In FIGS. 12A-12B, a charging station 1200 is shown having an induction strip 1202 onto which a plurality of candles 1220 or other electrical devices can be placed. Preferably, the strip 1202 includes a set of inductive coils such that the strip 1202 is configured to allow for inductive charging of the candles 1220 or other devices. In some contemplated embodiments, the strip 1202 could be configured to utilize the Qi standard developed by the Wireless Power Consortium. Preferably, the induction strip 1202 is configured to allow for free positioning of the candles or other devices to be charged such that the candles or devices are not required to be placed at specific positions of the strip 1202. For example, in one contemplated configuration, multiple cooperative flux generators could be used.

It is contemplated that the induction strip 1202 could be disposed in a tray, for example, such that a plurality of candles can be crowded in the tray and thereby charged without requiring that the candles be at a specific position. Thus, for example, the induction strip 1202 could be used in place of the charging ports of FIG. 1A.

Figure 13:
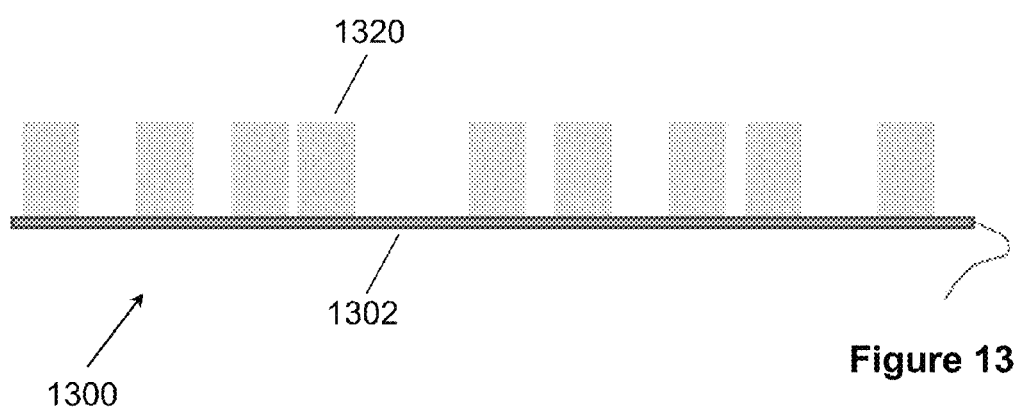
FIG. 13 is a side view of another embodiment of a charging station.

FIG. 13 illustrates another embodiment of a charging station 1300 having a thin, elongated metal strip 1302. Electric candles 1320 or other devices can be placed on the strip 1302, and can be charged when a low voltage plate on the bottom of the candles 1320 or other devices, for example, contacts the strip 1302. It is contemplated that the metal strip 1302 could be disposed in a tray, for example, such that a plurality of candles can be crowded in the tray and thereby charged without requiring that the candles be at a specific position. Thus, for example, the metal strip 1302 could be used in place of the charging ports of FIG. 1A.

Figure 14A:
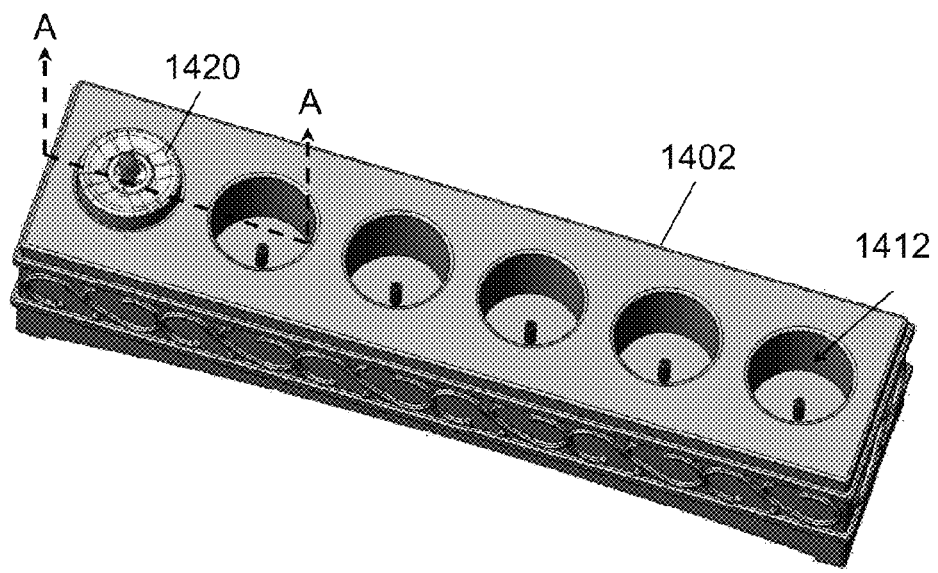
FIG. 14A is a perspective view of another embodiment of a charging station.
Figure 14B:
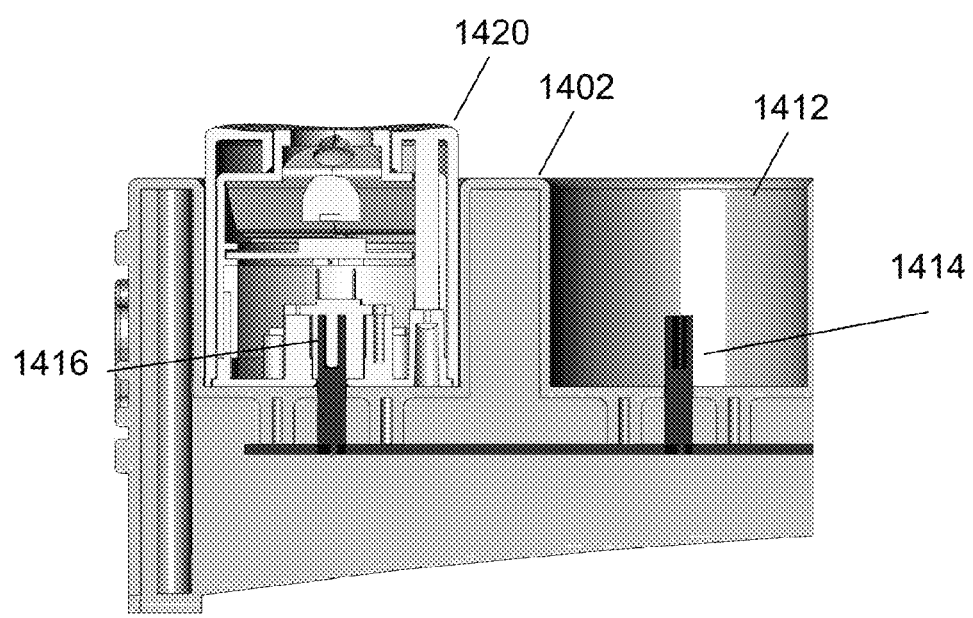
FIG. 14B is a vertical cross-section view of a portion of the charging station of FIG. 14A along line A-A.

FIGS. 14A-14B illustrate another embodiment of a charging station 1400 having a base 1402 with a plurality of charging ports 1412, which are each configured to receive an electric candle 1420 or other device. Each of the ports 1412 can include an electrical connector 1414 that extends perpendicularly from the port, and which is configured to be received into a female connector 1416 of the candle 1420 or other device. Preferably, the candles 1410 include one or more rechargeable batteries, which can be recharged by coupling the candle 1420 to the base 1402.

Figure 15:
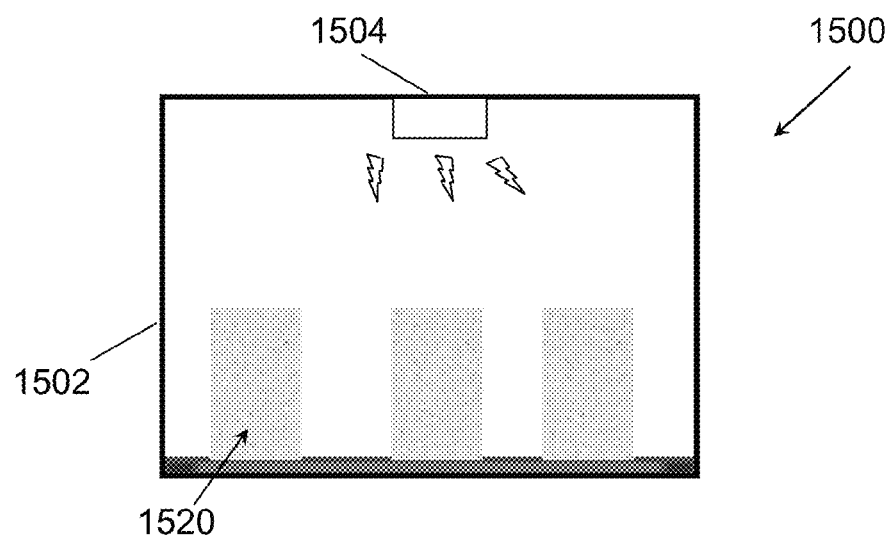
FIG. 15 is a front view of another embodiment of a charging station.

In FIG. 15, another embodiment of a charging station 1500 is shown having a resonant magnetic coil 1504 disposed within a housing 1502. The coil 1504 advantageously allows for wireless charging of at least one of the first and second sets of electric lights 1520 via resonant magnetic coupling. The station 1500 could be arranged to provide a dedicated area for charging, which could comprise a single level or multiple levels. Alternatively, the station could be disposed within a room such that the candles or other light sources could be charged without requiring that the candles or other light sources be moved to a dedicated station. This is advantageous for a restaurant, for example, where electric candles or other light sources could be disposed about one or more rooms, and can thereby eliminate the need to collect the candles each night for charging.

Figures 16A, 16B:
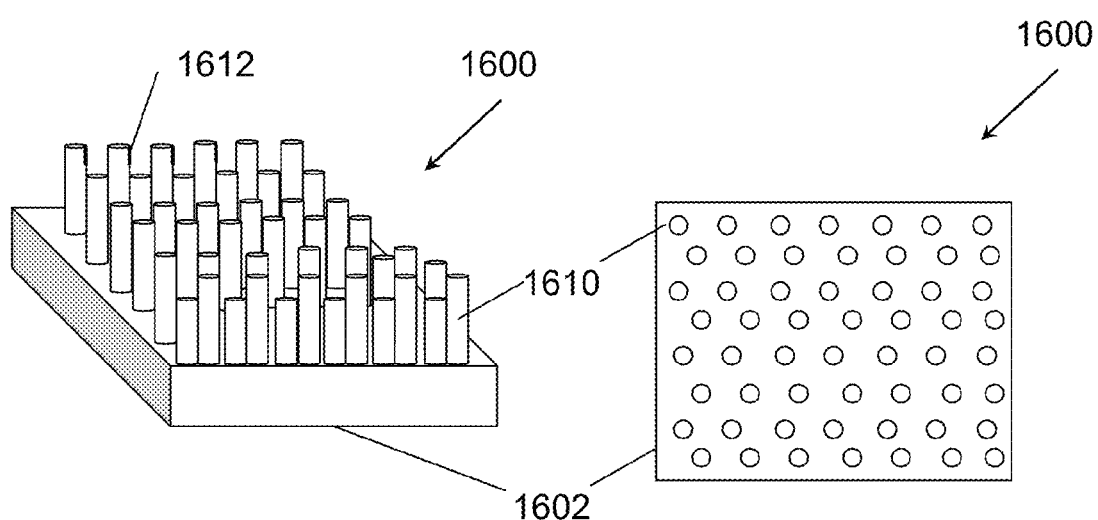
FIGS. 16A-16B is a perspective view and a top view, respectively, of another embodiment of a charging station.

FIGS. 16A-16B illustrates another embodiment of a charging station 1600, which can include at least one tray or platform 1602. The tray or platform 1602 can include a plurality of fingers 1610, at least some of which have an electrical contact 1612. Although shown on an upper side portion of the finger 1610, the electrical contact could be on a top portion of the finger or any other location to allow for electrical coupling of a candle or other device to the tray 1602. The fingers 1610 can each be configured to at least partially pivot about the point where the fingers 1610 couple to the tray or platform, for example. In this manner, the fingers 1610 can be reoriented to allow for the fingers to be disposed about a candle or other device to be charged.

In some contemplated embodiments, the fingers 1610 can each comprise a protruding electrical contact, which is biased upward but can retreat into the tray or platform 1602 when forced downward such as by an electric candle or other device. Thus, for example, if a larger candle is placed on the tray or platform, any contacts that are covered and not used by the candle or other device would be pushed downwardly into the tray or platform. This allows for small or larger candles to be charged without requiring separate trays for each.

The electric lights or candles can preferably include a memory configured to store one or more programs or software instructions that when run can direct one or more behaviors of the candle or light. For example, the program or instructions can direct when a candle should be illuminated, the duration of illumination per cycle/day, the brightness of each light source(s), the specific lighting pattern to display (e.g., colors, intensities, timing, etc.), and so forth.

It is further contemplated that the candles or other light sources could be programmed to automatically run a specific program when the candles or other light sources are electrically coupled to a charging station. A simplistic example would be that the candles are automatically illuminated when the candles are electrically coupled to a charging station. However, it is contemplated that the candles could be configured such that they can determine the specific type of charging station where they are electrically coupled, and could run a program specific to that type of charging station while they are electrically coupled. The determination could be as simple as the candle receiving a signal from the charging station to identify the charging station to the candle, or could be based on an arrangement of charging ports, the mechanism for charging, and so forth.

While the candles is being charged in a charging station, the candles could be sequenced for lighting effects such that the candles are illuminated and/or dimmed in succession, for example. In the embodiment shown in FIGS. 10A-10B, for example, the candles could be illuminated sequentially beginning with the upper or lower candle. It is further contemplated that the station could have an interface that allows a user to select a specific program, such as all candles on, all candles off, run sequence from top to bottom, run out of order sequence, run random illumination, or a fading pattern using the candles. It is further contemplated that the user could load an alternative program.

Any of the above charging stations could include a wireless interface such that the charging station can communicate with the electric candles or other devices while they are being charged/within the range of the interface. Exemplary interfaces include WIFI, infrared, Bluetooth, and so forth. In this manner, the electric candles or other devices can be programmed in a central location without requiring individual connection of each candle or device to a computer, for example. As an alternative, the candles could receive software instructions via the electrical coupling or other wired connection.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A charging station for electric lights, comprising:
   a base;
   first and second trays electrically coupled to the base and comprising first and second sets of physical couplings, wherein the first and second sets of physical couplings are configured to allow charging of first and second sets of electric lights, respectively, wherein each electric light of the first set of electric lights comprises a lighting program receiver and a memory configured to store a lighting program that specifies an operation of the electric light, wherein the second tray is removably coupled to the base such that the second tray is permitted to slide horizontally away from the base; and
   a lighting program transmitter coupled to the base and configured to transmit a revised lighting program to the lighting program receiver of one or more of the electric lights when the electric lights are charging via one or more of the physical couplings.

2. The charging station of claim 1, wherein the second tray is disposed above the first tray.

3. The charging station of claim 1, wherein the first and second trays are electrically coupled to the base in parallel.

4. A charging station for electric lights, comprising:
   a base;
   first and second trays electrically coupled to the base and comprising first and second sets of physical couplings, wherein the first and second sets of physical couplings are configured to allow charging of first and second sets of electric lights, respectively, wherein each electric light of the first set of electric lights comprises a lighting program receiver and a memory configured to store a lighting program that specifies an operation of the electric light, wherein the first set of electric lights comprises a first and a second electric light, and wherein a footprint of the first electric light is smaller than a footprint of the second electric light; and
   a lighting program transmitter coupled to the base and configured to transmit a revised lighting program to the lighting program receiver of one or more of the electric lights when the electric lights are charging via one or more of the physical couplings.

5. A charging station for electric lights, comprising:
   a base;
   first and second trays electrically coupled to the base and comprising first and second sets of physical couplings, wherein the first and second sets of physical couplings are configured to allow charging of first and second sets of electric lights, respectively, wherein each electric light of the first set of electric lights comprises a lighting program receiver and a memory configured to store a lighting program that specifies an operation of the electric light, wherein the first set of electric lights are each configured to receive the revised lighting program when the electric lights are electrically coupled to the first tray; and
   a lighting program transmitter coupled to the base and configured to transmit a revised lighting program to the lighting program receiver of one or more of the electric lights when the electric lights are charging via one or more of the physical couplings.

6. A charging station for electric lights, comprising:
   a base;
   first and second trays electrically coupled to the base and comprising first and second sets of physical couplings, wherein the first and second sets of physical couplings are configured to allow charging of first and second sets of electric lights, respectively, wherein each electric light of the first set of electric lights comprises a lighting program receiver and a memory configured to store a lighting program that specifies an operation of the electric light, wherein at least one of the first and second trays comprises a metal strip configured to extend across at least a portion of the tray, and wherein at least two of the electric lights receive current via the metal strip when the at least two electric lights contact the metal strip; and
   a lighting program transmitter coupled to the base and configured to transmit a revised lighting program to the lighting program receiver of one or more of the electric lights when the electric lights are charging via one or more of the physical couplings.

* * * * *